O. PREUSS.
IMPLEMENT FOR RAKING, TURNING, AND LOADING CORN, HAY, AND THE LIKE.
APPLICATION FILED FEB. 19, 1909.
933,785.
Patented Sept. 14, 1909.
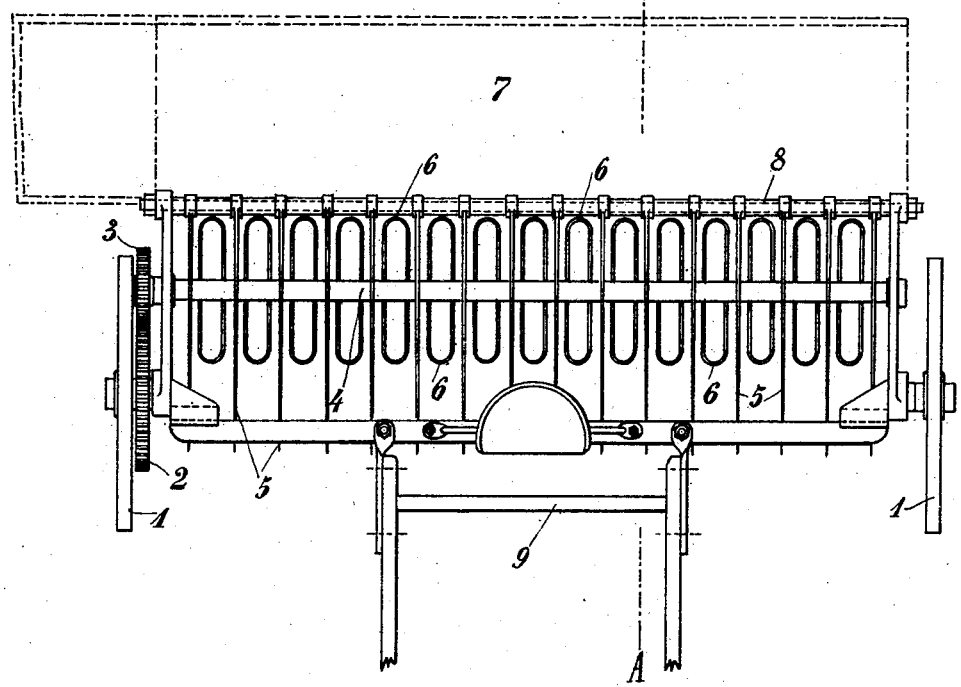
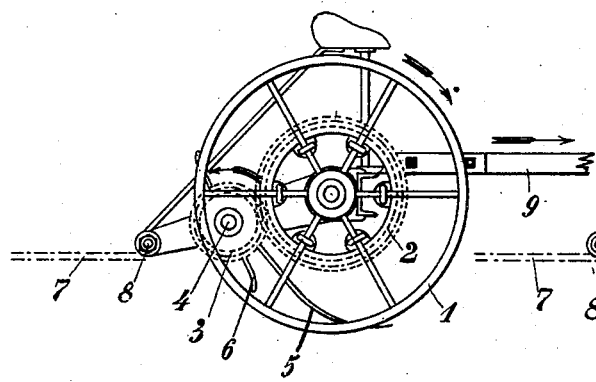
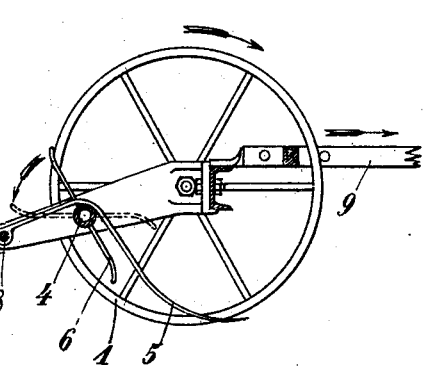
Witnesses.
Inventor.

UNITED STATES PATENT OFFICE.

OTTO PREUSS, OF ELBERFELD, GERMANY.

IMPLEMENT FOR RAKING, TURNING, AND LOADING CORN, HAY, AND THE LIKE.

933,785. Specification of Letters Patent. Patented Sept. 14, 1909.

Application filed February 19, 1909. Serial No. 478,966.

*To all whom it may concern:*

Be it known that I, OTTO PREUSS, a citizen of the German Empire, residing at Elberfeld, in the Province of Rhenish Prussia and Kingdom of Prussia, Germany, have invented certain new and useful Improvements in Implements for Raking, Turning, and Loading Corn, Hay, and the Like; and I do hereby declare the following to be a full, clear, and exact description of the invention, such as will enable others skilled in the art to which it appertains to make and use the same.

My invention relates to implements for raking, turning and loading corn, hay, and the like and consists in the construction and combination of parts hereinafter more particularly set forth and claimed.

One embodiment of an implement according to the present invention is represented, by way of example, in the accompanying drawing, in which:—

Figure 1 is a plan, Fig. 2 a side-elevation, and Fig. 3 a section on the line A—A Fig. 1.
On one of the two wheels 1 of the rake, a toothed rim or flange 2 is fixed, and said toothed flange engages with the toothed wheel 3 which serves to drive the shaft 4. The latter is provided with a number of arms or tines 6 which correspond in number with the rake-tines 5 hereinafter described, said tines 6 being suitably somewhat curved at their ends. On the shaft 4 rotating, said tines 6 pass through between the rake-tines 5, one tine 6 passing between each pair of rake-tines, and take up the material caught by the latter and convey it over the shaft 4 on to an elevator 7 or on to a conveying belt or the like, by which it is either conveyed to a wagon or deposited in rows. The rake-tines 5 are mounted loosely revoluble on the bar 8 which passes from side to side of the implement but cannot be displaced axially on said bar. Said rake-tines 5 can be raised by a suitable device for putting them out of action. The bar 8 is arranged comparatively low down on the implement and the tines 5 are of such an angular shape that they possess two portions, the one of which is inclined upward from the bar 8 and the other of which is inclined downward from the upper end of the first portion, the bottom free end of this downwardly inclined portion sliding on the ground in its working position. Under these tines and in particular under the vertex of the angle formed by each tine, the above-mentioned shaft 4 provided with the tines 6 is located.

In consequence of the above-described shape of the rake-tines and of the arrangement and construction of the implement as above set forth, the arms 6 when rotating in the direction indicated by the arrow push the material taken up by the tines 5 first of all upward and then downward again so that it is deposited behind the implement without shock or blow.

The draft-device 9, which in the example illustrated is shown fixed centrally on the implement, may with advantage be arranged at one side of the rake in order that the draft-animal may not tread on the material to be raked. In case the implement is combined with an elevator for loading on to a wagon the material raked up, the wagon travels always close to the rake and the draft-animals of the wagon and of the rake may then be suitably harnessed together and led by one driver.

What I claim as my invention and desire to secure by Letters Patent is:—

1. A raker, turner and loader consisting of the combination of a frame, a non-rotatable shaft, a series of tines fixed thereon each tine being first inclined upward and forward and then curved downward and forward, a rotating shaft arranged under said series, gearing for the latter shaft and tines mounted upon and rotating with said rotatable shaft.

2. Implement for raking, turning, loading and depositing corn, hay and the like, comprising in combination a frame, a bar fixed to said frame and extending from side to side of the same, a plurality of rake-tines revolubly mounted at their ends on said bar, and a rotating-shaft provided with a plurality of tines, the paths of rotation of which pass between the tines of the rake, said shaft being higher on the frame than the above-mentioned bar and being located under the tines of the rake.

3. Implement for raking, turning, loading and depositing corn, hay and the like, comprising in combination a frame, a bar fixed to said frame and extending from side to side of the same, a plurality of rake-tines revolubly mounted at their ends on said bar each tine having an angular shape, and a rotating-shaft provided with a plurality of tines, the paths of rotation of which pass between the tines of the rake, said shaft being higher on the frame than the above-mentioned bar and being located under the vertices of the angles of the tines of the rake.

4. Implement for raking, turning, loading and depositing corn, hay and the like, comprising in combination a frame, two running wheels on said frame, a toothed flange on one of said wheels, a bar fixed to said frame and extending from side to side of the same, a plurality of rake-tines revolubly mounted at their ends on said bar, each tine having an angular shape, a revoluble shaft provided with a plurality of tines, the paths of rotation of which pass between the tines of the rake, said shaft being higher on the frame than the above-mentioned bar and being located under the vertices of the angles of the tines of the rake, and a toothed-wheel on said shaft engaging with said toothed flange on one of the running wheels.

In testimony whereof, I have signed my name to this specification in the presence of two subscribing witnesses.

OTTO PREUSS. [L. S.]

Witnesses:
    OTTO KÖNIG,
    ERNST GORBIRG.